(12) United States Patent
Martinez et al.

(10) Patent No.: US 7,275,104 B1
(45) Date of Patent: Sep. 25, 2007

(54) WEB-SERVICES-BASED DATA LOGGING SYSTEM INCLUDING MULTIPLE DATA LOGGING SERVICE TYPES

(75) Inventors: Frank Martinez, La Canada, CA (US); Paul Kevin Toth, Daly City, CA (US)

(73) Assignee: Blue Titan Software, Inc., San Francisco, CA (US)

( * ) Notice: Subject to any disclaimer, the term of this patent is extended or adjusted under 35 U.S.C. 154(b) by 848 days.

(21) Appl. No.: 10/425,802

(22) Filed: Apr. 29, 2003

(51) Int. Cl.
*G06F 15/16* (2006.01)
*G06F 15/173* (2006.01)

(52) U.S. Cl. .................. 709/224; 709/218; 709/225; 709/236; 709/238

(58) Field of Classification Search ............ 705/31; 707/1; 379/201.01; 709/236, 318, 224, 709/225, 226, 238
See application file for complete search history.

(56) References Cited

U.S. PATENT DOCUMENTS 6,308,216 B1 * 10/2001 Goldszmidt et al. ........ 709/236
2002/0095524 A1 * 7/2002 Sanghvi et al. ............. 709/318
2003/0016803 A1 * 1/2003 Schmid et al. ......... 379/201.01
2003/0055808 A1 * 3/2003 Bhat .............................. 707/1
2003/0105687 A1 * 6/2003 Bross et al. .................. 705/31

* cited by examiner

*Primary Examiner*—Rupal Dharia
*Assistant Examiner*—Quang N. Nguyen
(74) *Attorney, Agent, or Firm*—Mark J. Spolyar

(57) ABSTRACT

Methods, apparatuses, and systems allowing for configuration of message logging policy on a granular basis for web services networks. In certain embodiments, the present invention allows for an efficient data logging scheme where only messages, or message elements, of interest are stored. According to one embodiment of the present invention, the fabric services associated with the web services network architecture supports different instances of a logging service to which message data are logged. For example, the logging service instances can be configured to log only header information (header logging instance), only payload information (payload logging instance), or entire messages (message logging instance). The web services network control points can be configured to flag messages transmitted to a logging node with a logging service type, which determines which logging service instance operates on the message.

5 Claims, 4 Drawing Sheets

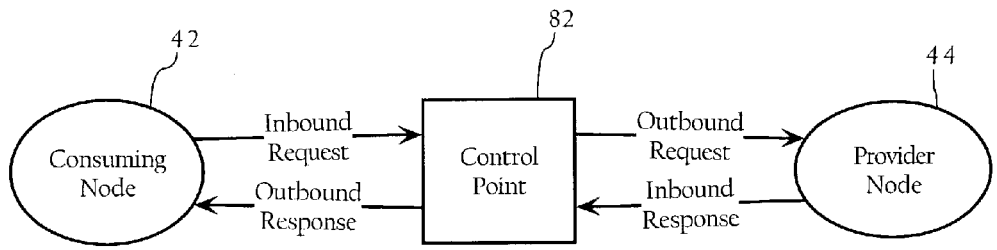
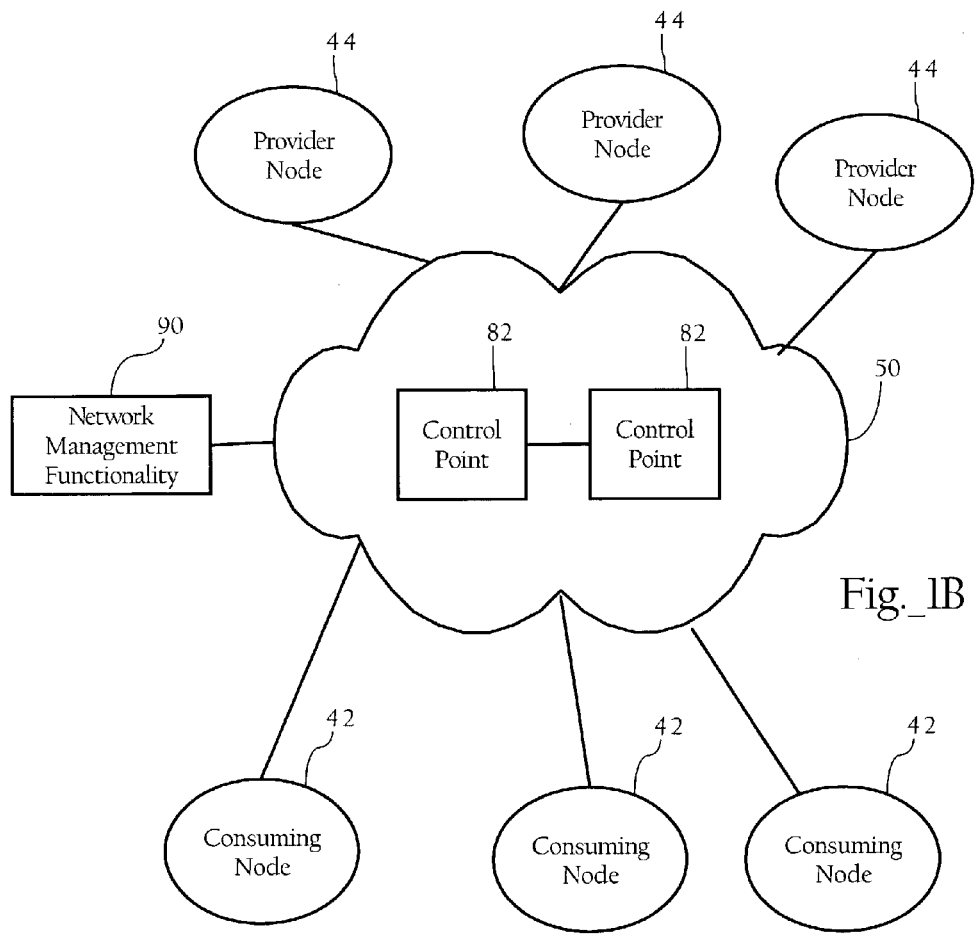

Fig._3

WEB-SERVICES-BASED DATA LOGGING SYSTEM INCLUDING MULTIPLE DATA LOGGING SERVICE TYPES

CROSS REFERENCE TO RELATED APPLICATIONS

The present application makes reference to the following commonly owned U.S. patent applications, which are incorporated herein by reference in their entirety for all purposes:

U.S. patent application Ser. No. 09/990,722 in the name of Frank Martinez and Paul Toth, entitled "Distributed Web Services Network Architecture;"

U.S. patent application Ser. No. 10/387,197 in the name of Frank Martinez, Paul Toth, and Parand Tony Darugar, entitled "Web-Services Based Computing Resource Lifecycle Management;" and U.S. patent application Ser. No. 10/411,848 in the name of Frank Martinez and Paul Toth, entitled "Policy-Based, Distributed Message Router."

FIELD OF THE INVENTION

The present invention relates to computer networks and, more particularly, to a web-services-based data logging system that facilitates logging and analysis tasks associated with monitoring a plurality of network devices. In certain embodiments, the present invention is a data logging system including multiple data logging service types.

BACKGROUND OF THE INVENTION

Web services networks are rapidly evolving technology architectures allowing applications to tap into a variety of services in an extremely efficient and cost effective manner. Web services enable cost-effective and efficient collaboration among entities within an enterprise or across enterprises. Web or application services are network addressable computing resources that exchange data and execute processes. Essentially, Web services are applications exposed as services over a computer network and employed by other applications using Internet standard technologies, such as XML, SOAP, WSDL, etc. Accordingly, Web applications can be quickly and efficiently assembled with services available within an enterprise LAN or external services available over open computer networks, such as the Internet.

A Web services network can be deployed across an enterprise LAN or across a Wide Area Network, such as the Internet. A typical Web services network includes at least one network services broker that is operative to receive a service request and route the service request to the appropriate resource. A broker is a specially configured server or cluster of servers acting as an intermediary for Web service requests and responses. As Web services network usage increases, however, the broker can become a bottleneck. To ease this bottleneck, the prior art solution is simply to add additional processing power to the broker (e.g., additional servers), which is costly, inefficient, and fails to leverage the enterprise's investments in its existing network infrastructure. Moreover, the centralized nature of the broker creates reliability concerns in that failure of the broker disables the applications accessing services through it. Accordingly, U.S. application Ser. No. 09/990,722 discloses a distributed Web services network architecture that, among other things, alleviates the bottleneck and point-of-failure concerns discussed above.

Administration of Web services networks often requires the logging and analysis of vast amounts of data relating both to the service endpoints, as well as the health and status of the Web services network itself. For example, Web services often involve Service Level Agreements that specify a required level of service, sometimes expressed relative to certain performance metrics, such as downtime, uptime, latency, failure rates, and the like. SLA compliance monitoring, therefore, involves maintaining a vast array of data, often collected by a large number of control points implementing Web services network functionality. SLA compliance data, however, is just one of a variety of information relating to Web services networks, where it is desirable to log and analyze the data, such as data relating to the operation and health of the Web services network itself.

In addition, often for reporting and analysis purposes, the messages associated with a web service invocation are logged and stored in their entirety. Accordingly, as one can imagine, a vast amount of data is created by these informational requirements. While certain analysis tasks however may require examination of entire messages, other analysis tasks may only require examination of certain elements of messages, such as request and response headers. Still further, a particular analysis task may require examination of requests in their entirety, but only the headers associated with the resulting responses. Still further, these informational requirements may change depending on the Web- or application-service being invoked, and even the specific operations associated with the Web- or application-service. For example, data relating to certain message types in a web service invocation may be of interest, while other message types may not be of interest. Prior art data logging technologies, however, do not allow for such granular control over what log information is extracted and stored during operation of the web services network infrastructure. This circumstance often results in the storage of large amounts of data that is ultimately never used. While this does not seem to be a pressing problem in smaller networks, large network environments produce vast amounts of information, increasing the cost and complexity of storing and analyzing the resulting log data.

In light of the foregoing, a need in the art exists for methods, apparatuses and systems that enables granular control of logging policy to enhance the efficiency of data logging in computer network environments. Embodiments of the present invention substantially fulfill this need.

SUMMARY OF THE INVENTION

The present invention provides methods, apparatuses, and systems allowing for configuration of message logging policy on a granular basis for web services networks. In certain embodiments, the present invention allows for an efficient data logging scheme where only messages, or message elements, of interest are stored. According to one embodiment of the present invention, the fabric services associated with the web services network architecture supports different instances of a logging service to which message data are logged. For example, the logging service instances can be configured to log only header information (header logging instance), only payload information (payload logging instance), or entire messages (message logging instance). The web services network control points can be configured to flag messages transmitted to a logging node with a logging service type, which determines which logging service instance operates on the message.

DESCRIPTION OF THE DRAWINGS

FIG. 1A is a functional block diagram illustrating the message flows associated with a web services invocation.

FIG. 1B is a functional block diagram illustrating a computer network environment according to an embodiment of the present invention.

DESCRIPTION OF PREFERRED EMBODIMENT(S)

For didactic purposes, embodiments of the present invention are described as operating in connection with a Web services network, wherein the control points implement Web services network functionality to mediate the transport of messages associated with Web services invocations and log data allowing for analysis tasks, such as calculation of various performance measures related to Service Level Agreements (SLAs) corresponding to Web or other application services, and/or the status of the web services network. However, as one skilled in the art will recognize, the policy-based data logging system can be employed in a variety of network environments to achieve a vast array of objectives.

A. Operating Environment and Operation

Figure 2:
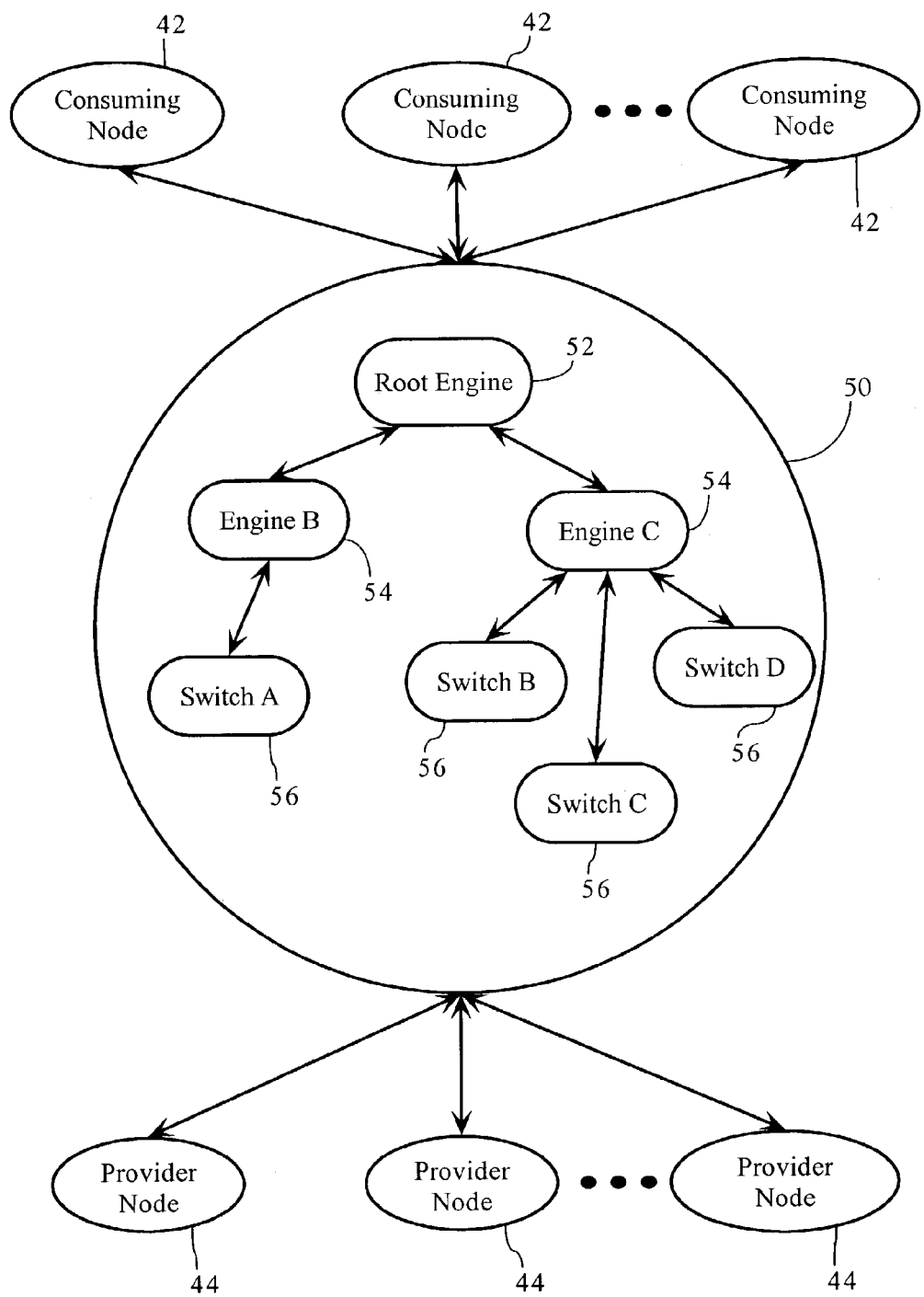
FIG. 2 is functional block diagram setting forth the network architecture associated with an embodiment of the present invention.

FIGS. 1A and 1B are functional block diagrams illustrating the functionality and basic operating elements associated with an embodiment of the present invention. Provider node 44 is a network addressable computing resource operably connected to computer network 50. In one embodiment, provider node 44 is an end-system that hosts a Web- or other network-based application accessible to consuming applications using predefined, published interfaces and protocols. Consuming node 42 is a network addressable end-system that consumes or invokes the computing resources associated with one or more provider nodes 44. In one embodiment, consuming node 42 hosts a Web-based application that consumes one or more Web services hosted by one or more provider nodes 44, as discussed more fully below. Computer network 50 generally refers to a variety of computer network architectures including one or more intermediate systems operative to route messages between end-systems operably connected thereto. As FIG. 1B illustrates, computer network 50 includes at least one control point 82 operative to route messages between provider nodes 44 and consuming nodes 42. In one embodiment, computer network 50 is a Web services network infrastructure that supports the routing of service operation requests and responses between Web services consumers 42 and Web services providers 44. In the context of Web or application service infrastructures, control point 82 may be implemented as a Web services network broker or gateway, or as a proxy in a peer-to-peer Web services network architecture. As illustrated in FIG. 2, control point 82 may also be a routing node (such as engine 54 or switch 56) in a distributed Web services network architecture according to U.S. application Ser. No. 09/990,722.

As discussed above, control point 82 processes messages transmitted across computer network 50 between provider nodes 44 and consuming nodes 42. In one embodiment, control point 82 is operative to process Web service operation requests transmitted by consuming nodes 42. For example, control point 82 may be a routing node, such as an engine 54 or switch 56 in a distributed Web services network architecture (see FIG. 2), operative to mediate the transport of messages between consuming nodes 42 and provider nodes 44. In one embodiment, the control point 82 comprises a control point module and a routing directory (see below), both directed to mediating transport of messages associated with web- or application-service invocations. In one embodiment, the functionality associated with control point 82 includes policy execution (e.g., transformation of messages from one format to a second format, security policies, access control policies, etc.), routing and dispatch. For example, as discussed in U.S. application Ser. No. 10/387,197, a consuming node 44, to invoke a given Web service operation, may open a connection with control point 82 using a first binding type, while the control point 82 may employ a different binding type to open a connection with the endpoint associated with the Web service invocation. In one embodiment, the control point 82 includes the policy, based message routing functionality disclosed in U.S. application Ser. No. 10/411,848, which is incorporated by reference herein. The selection of the second binding type, for example, can be a matter of policy configurable by a network administrator or a policy agent as discussed more fully below. As FIG. 2 illustrates, in one embodiment, the control points 82 are either network services engines 52, 54 or switches 56 in a distributed, hierarchical Web services network architecture. U.S. application Ser. Nos. 09/990,722 and 10/387,197, incorporated by reference herein, disclose operation of a distributed, hierarchical Web services network architecture.

Network management functionality 90 generally refers to the interface and related functionality associated with Web services network 50. In one embodiment, network management functionality 90 provides the interface by which the operational parameters (e.g., routing table entries, etc.) of one or more control points 82 are configured. In the context of Web services networks, network management functionality comprises a management platform facilitating management and configuration tasks associated with a Web services network infrastructure, such as registration, configuration, and discovery of Web services. Registration, discovery and provisioning of Web services is disclosed in U.S. application Ser. No. 10/387,197, identified above. In one embodiment, network management functionality allows network administrators to configure logging policy on a service-wide basis or as to the individual operations associated with a given service.

Figure 3:
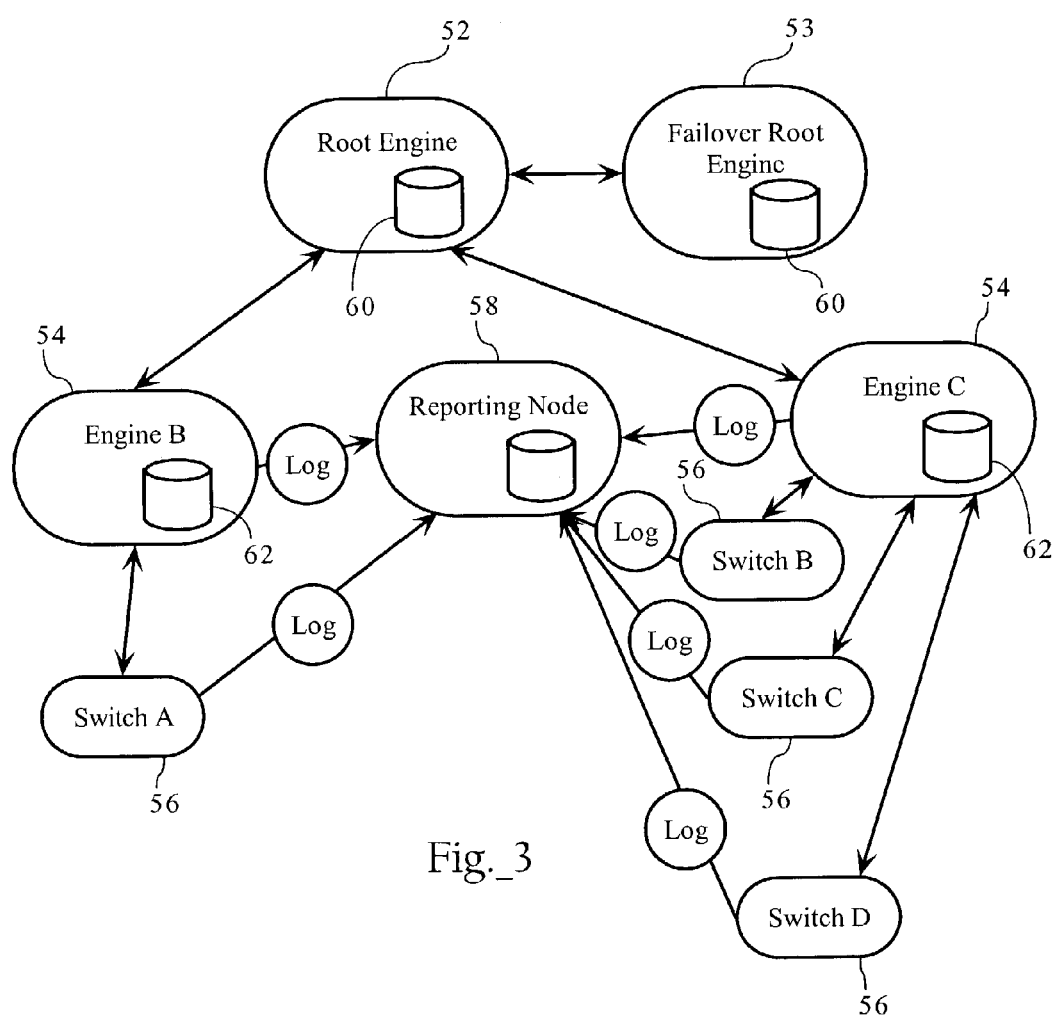
FIG. 3 is a functional block diagram showing the flow of log data to a central data collection node, according to an embodiment of the present invention.

FIG. 3 illustrates the flow of log data from the control points, here engines 54 and switches 56, to a central logging node (here, reporting node 58). Other schemes and data collection architectures are also possible. For example, switches 56 may transmit log data to corresponding engines 54 for logging, aggregation and analysis purposes. In one embodiment, the logging node (here, reporting node 58) provides a web services interface supporting a plurality of logging service types as discussed in more detail below. According to such an embodiment, the engines and switches log message data by essentially invoking a logging service implemented on reporting node 58.

A.1. Web Services Invocation and Message Types

As discussed in U.S. application Ser. Nos. 09/990,722 and 10/387,197, web services network architectures comprise one or more control points that mediate the transport of messages between consuming nodes and providing nodes. FIG. 1A illustrates the message types and message flow associated with a web service invocation involving a control point 82, where the message types are named relative to the control point 82. As FIG. 1A illustrates, to invoke a web service hosted by provider node 44, a consuming node 42 composes a request and transmits to a control point 82 associated with the web services network fabric. Using information in the inbound request, the control point 82 determines the endpoint location of the provider node 44 and forwards the message (outbound request) to it. The provider node 44 responds to the message and transmits a response (inbound response) to the control point 82, which forwards the response (outbound response) to the consuming node 44. As discussed above, U.S. application Ser. Nos. 09/990,722 and 10/387,197 disclose routed architectures that mediate transport of messages associated with web services invocations.

A.2. Application of Logging Policy to Message Types

As part of the process of applying policy to a particular request, the control point determines which policies are applicable. As discussed in U.S. application Ser. No. 10/411,848, different policy types may be applied to many different message types associated with a Web service invocation. At a minimum, the control point 82 takes into account which service is being invoked, which operation is being invoked, and the type of message being processed. Message type refers to the message corresponding to a given stage of the Web service invocation addressed by a particular message. FIG. 1A and the description above shows four message types associated with a web service invocation, according to an embodiment of the present invention: 1) inbound request (IBR), 2) outbound request (OBR), 3) inbound response (IBS), and 4) outbound response (OBS). For didactic purposes, the illustrative example provided by FIG. 1A assumes use of a two-way (request-response) protocol. However, the same principles apply regardless of the communications protocols and actual number of message types involved in any particular invocation. Additional message types can include internal message types, inbound faults and outbound faults, generated by the control point itself. An internal fault message is generated, in one embodiment, when a message, that does not represent a fault, fails to comply with established policy constraints. As discussed in U.S. application Ser. No. 10/411,848, control point 82 generally responds to such a message by either performing "damage control" on the errant message in an attempt to correct the identified problem, or generates a SOAP fault for eventual receipt by the requestor. Table 1 provides a set of possible message types associated with an embodiment of the present invention.

TABLE 1

| Message Types | |
| --- | --- |
| IBR | Inbound Request |
| OBR | Outbound Request |
| IBS | Inbound Response |
| OBS | Outbound Response |
| IBF | Inbound Fault |
| OBF | Outbound Fault |

As discussed in U.S. application Ser. No. 10/411,848, the control point can apply transformation policies to transform an inbound message to an outbound message. As discussed herein, the control point can log both the inbound and outbound messages. Accordingly, embodiments of the present invention allow for application of logging policy to the different message types set forth in Table 1. In addition, as Table 2 illustrates, configuration of logging policy can be applied at a more granular level to allow for the specification of logging policy for each message type for a given Service (for didactic purposes, DisorderEncyclopedia).

TABLE 2

| Logging Policy for Service DisorderEncyclopedia | |
| --- | --- |
| Type | Logging Policy to be applied |
| IBR | Entire Message |
| OBR | Header Only |
| IBS | Entire Message |
| OBS | Payload Only |
| IBF | Header Only |
| OBF | Header Only |

In one embodiment, configuration of logging policies to different message types can be applied at yet a more granular level. For example, the control point 82 can be configured to apply different policies to specific operations associated with a given Web- or application-service, as opposed to all operations associated with a given service. Table 3 provides an example logging policy table for two hypothetical operations associated with the hypothetical DisorderEncyclopedia service.

TABLE 3

| Logging Policy for Service DisorderEncyclopedia | | |
| --- | --- | --- |
| Type | Policies for Operation GetSymptoms | Policies for Operation GetTreatment |
| IBR | Entire Message | Entire Message |
| OBR | Payload Only | Entire Message |
| IBF | Header Only | Header Only |
| IBS | Entire Message | Entire Message |
| OBS | Header Only | Payload Only |
| OBF | Header Only | Header Only |

A.3. Application of Logging Policy and Logging Policy Types

In one embodiment, the control point 82 recognizes several distinct logging policy types. A control point 82 may apply policies belonging to any or all of these policy types to any Web service operation, as discussed more fully below. In one embodiment, control point 82 supports at least three logging policy types: 1) an entire message logging policy, 2) a header-only logging policy, 3) a payload-only logging policy. In one embodiment, the control point 82 is operative to flag or otherwise associate the messages transmitted to the logging node with the appropriate logging policy type.

In one embodiment, control point 82 logs messages with a central logging node, such as reporting node 58 of FIG. 3, by encapsulating the message with a log header and transmitting the encapsulated message to the logging node. As to inbound messages, control point 82, in one embodiment, is operative to look up the logging policy, if any, associated with the message, apply the associated logging policy, and transmit the log message to a data logging node. As to outbound messages, control point 82 looks up and applies the logging policy and transmits the log message to the data logging node either concurrently or successively with transmission of the outbound message to its destination. In one embodiment, control point 82 can transmit the entire message. In another embodiment, control point 82 only includes that portion of the message appropriate to the applicable logging policy.

In one embodiment, the log message header includes various metadata relating to the message. For example, if the message is an inbound service response (ISR) message, the log header may include a message type identifier, and the response time between the outbound request message and the ISR message. In one embodiment, the log header further includes a field reserved for a logging policy type identifier. The logging node, in one embodiment, is operative to receive the log message and apply the logging policy identified in the log header.

In another embodiment, the different logging policies are presented as different operations associated with the logging service hosted by reporting node 58. For example, given the logging service types above, reporting node 58 may host a service have three operations: 1) entire message logging operation, 2) header-only-logging operation, and 3) payload-only logging operation. In such an embodiment, control points 82 transmit log messages by invoking the logging service operation corresponding to the logging policy configured for the instant message.

A.4. Routing Tables

Figure 4:
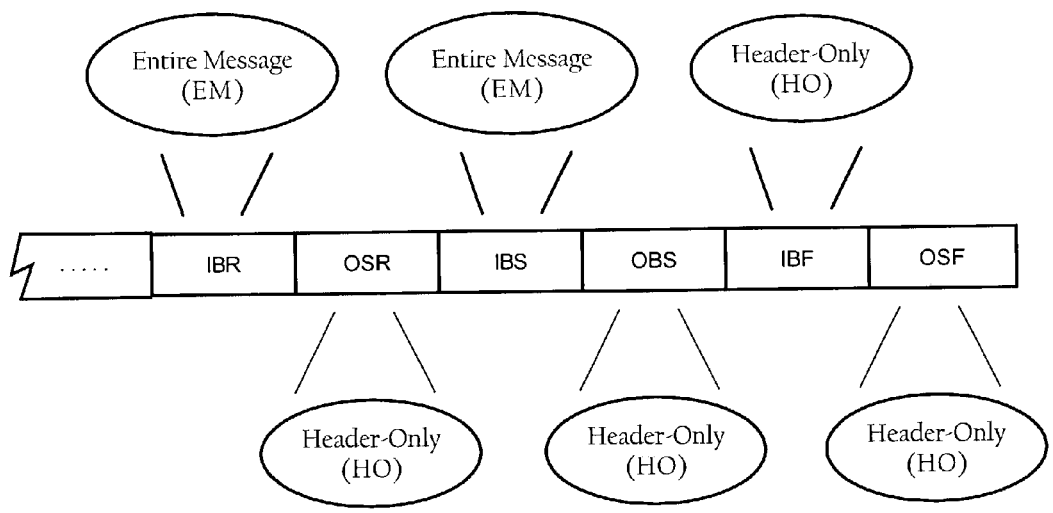
FIG. 4 is a diagram showing the routing table extensions supporting application of logging policy to various message types associated with a web services invocation, according to an embodiment of the present invention.

In one embodiment, the control points 82 each include routing information similar to the routing information disclosed in U.S. application Ser. Nos. 09/990,722 and 10/387,197. For example and in one embodiment, the control points 82 support a variety of routing entities, such as services, operations, and the like. As discussed more fully below, however, the routing entity information and the routing tables associated with certain embodiments of the control points 82 require extensions to support the implementation of logging policy on a per-message type and/or per-operation basis. FIG. 4 illustrates extensions, according to an embodiment of the present invention, supporting identification of logging policy for different message types during mediation of a web service invocation. These extensions can be associated to a given web service and, thus, applied to the message types associated with a web service on a global basis. In another embodiment, these extensions can be associated to individual operations supported by a web service. For example, the extensions set forth in FIG. 4 can extend the routing table entries associated with service operations described in U.S. application Ser. Nos. 09/990,722 and 10/387,197.

As FIG. 4 illustrates, the routing information extensions, in one embodiment, include for each message type, logging policy identifiers. In one embodiment, the identifiers can be URIs associated with a logging service operation hosted by reporting node 58. As FIG. 4 illustrates, each message type may be assigned its own logging policy. In one embodiment, control point 82, by default, does not log a message of a given message type if no logging policy identifier is included in a corresponding field, allowing for precise control of which messages associated with a web service invocation are logged. For example, a network administrator may, for a given service or service operation, specify a logging policy for inbound requests exclusively, while omitting to specify logging policy for other message types.

As discussed in U.S. application Ser. Nos. 09/990,722 and 10/387,197, the routing of service operation requests and responses, as well as distribution of topic messages, can rely on standard network protocols, such as SOAP, HTTP, XML and the like. A routing node, such as control point 82, receives a service operation request including a header identifying the source and an operation. The routing node scans its routing table for the computer network address associated with the service and/or operation. The routing node then opens an HTTP or other connection with the endpoint location corresponding to the computer network address and transmits the request to it. For synchronous service operation requests, the HTTP connection remains open until the publishing node responds or the request times out. For asynchronous requests, the HTTP connection is closed. The subscriber node issues a request to retrieve the response at a later time. Still further, for service operation requests designating a publisher beyond the firewall or domain associated with the network infrastructure, embodiments of the present invention open a secure communications path using standard techniques, such as Secure Sockets Layer, HTTPS or other suitable technologies. Similarly, the log messages can be transmitted to reporting node 58 using the same network protocols, such as SOAP, HTTP, XML and the like.

A.4.a. Routing Entities and Routing Entries in Global Routing Table

As discussed in the above-identified applications, the Web services network according to one embodiment operates in an environment including five routing entity types: 1) subscribers, 2) publishers, 3) services, 4) operations, and 5) end-users. In one embodiment, routing entity information is maintained in a database, such as a relational database system maintaining a plurality of tables corresponding to different entity types. This database, in one embodiment, is accessible to Web services network management functionality 90 to allow for creation and modification of routing entities, and to control point 82 to allow for creation and modification of corresponding routing table entries in its local routing tables as described herein. In one embodiment, end-user routing entities are registered on the network in association with a set of profile values, including, for example, 1) an end-user routing entity identification; 2) a subscriber identification (the routing entity identification of the subscriber to which the user corresponds); 3) the user's name; and 4) the user's email address. The profile information associated with an end-user routing entity allows publishers to provide and customize services on a per end-user basis. Accordingly, the profile set can include any type of data deemed necessary by a publisher for a particular service and/or operation. The information associated with other routing entities is disclosed in U.S. application Ser. No. 09/990,722. For example, a service routing entity may include an access control (subscriber) list defining the subscribers and/or end-users authorized to access a given service.

In one embodiment, the routing entity information discussed above is maintained in the local routing tables of control point 82. A local routing table, in one embodiment, comprises one or more routing entries. To optimize the routing table lookups, information relating to routing entities are arranged as a series of routing table entries in a hash table or map wherein, in one embodiment, each routing entry includes information allowing for the routing of a service operation request involving a particular subscriber. In one embodiment, each routing entry, in one embodiment, has two main components: a key and a value. Information concerning a particular routing entity can be culled from a given routing entry key-value pair and used to construct a new routing entry in local routing tables. As one skilled in the art will recognize however the information in the local routing tables can be arranged in a variety of manners. For example, local routing tables can maintain a plurality of data structures (e.g., relational tables) corresponding to each routing entity type.

As the following exemplary routing table description illustrates, an operation is associated with a service identification and an operation identification. In one embodiment, the key comprises the following elements: 1) Network Operator ID, 2) Web Service Network ID, 3) Operation Name (the name of an operation), 4) Service Name, and 5) Subscriber ID (a unique routing entity identification). The value of a routing entry, in one embodiment, comprises the following elements: 1) operation_id (a unique routing entity identifier for an operation); 2) an operation_type flag (indicating whether the operation type is internal or external; an internal operation type corresponds to an operation associated with a network platform service (e.g., routing entity request service, entity creator service, etc.), while an external operation type identifies an operation associated with a Web- or application service); 3) one or more operation_urls (the URL where the published service/operations are located; each URL may comprise a DNS hostname or an IP address and, optionally, a port number); 4) service_id (a unique routing entity identification corresponding to the service associated with the operation); 5) service type (indicates a 'legacy service' that is simply logged for reporting purposes or normal Web service); 6) publisher id (a unique routing entity identification corresponding to the publisher/provider of the service); 7) broadcast flag (when the flag is set, it generally indicates that the service is a topic and signals to the routing node that all identified operation_urls are to receive the message; otherwise, one operation_url is chosen from the list); and 8) is valid subscription (a Boolean value indicating whether the subscription associated with the subscriber_id is valid).

According to certain embodiments of the invention, the value component further includes the logging policy block comprising the logging policies for the message types associated with a web service invocation (see FIG. 4). Furthermore, the key and value components of a routing entry may include a variety of different elements, relationships and associations to achieve various objectives. For example, the key may contain an end-user routing entity identification to allow for creation and enforcement of subscriptions or authorizations to publish to a topic at the end-user level. In one embodiment, an end-user name and a subscriber name, in combination, may map to an end-user routing entity identification in the local routing table. Still further, the routing tables may include a plurality of tables corresponding to the different routing entity types instead of the hash table format discussed above.

As discussed above, in one embodiment, a service operation request includes a header containing the key elements associated with a routing entry (in one embodiment: operation_name, service_name, and subscriber_id). In one embodiment, the service operation request header further includes a transaction identification used in connection with transaction support services. Still further, a service operation request header may further include a message identification generated by a subscriber to facilitate handling of asynchronous service operation requests. Accordingly, when a publisher transmits a topic message, the corresponding header includes a null or dummy operation name, a service name corresponding to the topic and a publisher name.

For service operation requests, the control point performs certain error checks on the service operation request, as part of basic routing functionality. For example and in one embodiment, the routing node returns an error XML response, if 1) it cannot parse the XML request, 2) the request does not contain sufficient key information for a routing entry lookup, or 3) a key is invalid (e.g., a key value could not have been generated by the network). Assuming no such errors and that the subscription is valid, the routing node routes the request to the endpoint(s) identified in the request header by sending the XML service operation request using the operation_url value(s) associated with the routing entry. For a service operation, the broadcast flag is not set, indicating that the routing node should route the request to a single endpoint. In one embodiment, the routing node can send the request to the first identified endpoint, using the remaining endpoint(s) as failover nodes. In another embodiment, the routing node can arbitrate among the listed endpoints to perform a form of load balancing.

Lastly, although the present invention has been described as operating in connection with end systems employing XML, SOAP, HTTP, TCP and IP protocols, the present invention has application in computer network environments employing any suitable Web services networking, session layer, transport layer and network layer protocols. Moreover, while embodiments of the present invention have primarily been described as operating in connection with a Web services network architecture, as discussed above, policy-based, message logging system can be incorporated into a variety of network architectures. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A control point enabling policy-based data logging, comprising:
    a control point module operative to mediate transport of messages between providing nodes and consuming nodes, said control point module, as part of said transport mediation, being operative to:
        identify message types corresponding to the messages transmitted between the providing nodes and the consuming nodes;
        associate logging service types to the messages based on the corresponding messages types; and
        transmit the messages to a data logging node with indications of the logging service types;
    a network directory comprising at least one service operation identifier, at least one message type identifier associated with the at least one service operation identifier, and at least one logging service type identifier associated with the at least one message type identifier, and wherein said control point module is operative to access the network directory to associate logging service type identifiers with the messages, and wherein the at least one logging service type identifier is a header-only logging service identifier.

2. A control point enabling policy-based data logging, comprising:
    a control point module operative to mediate transport of messages between providing nodes and consuming nodes, said control point module, as part of said transport mediation, being operative to:
        identify message types corresponding to the messages transmitted between the providing nodes and the consuming nodes;

associate logging service types to the messages based on the corresponding messages types; and transmit the messages to a data logging node with indications of the logging service types;

a network directory comprising at least one service operation identifier, at least one message type identifier associated with the at least one service operation identifier, and at least one logging service type identifier associated with the at least one message type identifier, and wherein said control point module is operative to access the network directory to associate logging service type identifiers with the messages, and wherein the at least one logging service type identifier is a payload-only logging service identifier.

3. A data logging node supporting a plurality of data logging service types, comprising:

a data logging interface operative to support the plurality of data logging service types;

a data logging module operative to:
  receive a log message and a data logging service type identifier; and
  store at least one element of the log message, wherein the at least one stored element is based on the data logging service type identifier associated with the log message; and wherein the log message comprises a header and a payload, and wherein the payload comprises a message associated with a web services invocation between a consuming node and a providing node, and wherein the header includes the data logging service type identifier associated with the log message;

wherein the at least one stored element of the log message is one from the group comprising the message header and the message payload; and wherein one of the plurality of data logging service types is a header-only message logging type.

4. A data logging node supporting a plurality of data logging service types, comprising:

a data logging interface operative to support the plurality of data logging service types;

a data logging module operative to:
  receive a log message and a data logging service type identifier; and
  store at least one element of the log message, wherein the at least one stored element is based on the data logging service type identifier associated with the log message; and wherein the log message comprises a header and a payload, and wherein the payload comprises a message associated with a web services invocation between a consuming node and a providing node, and wherein the header includes the data logging service type identifier associated with the log message;

wherein the at least one stored element of the log message is one from the group comprising the message header and the message payload; and wherein one of the plurality of data logging service types is a payload-only message logging type.

5. A data logging node supporting a plurality of data logging service types, comprising:

a data logging interface operative to support the plurality of data logging service types;

a data logging module operative to:
  receive a log message and a data logging service type identifier; and
  store at least one element of the log message, wherein the at least one stored element is based on the data logging service type identifier associated with the log message; and wherein the log message comprises a header and a payload, and wherein the payload comprises a message associated with a web services invocation between a consuming node and a providing node, and wherein the header includes the data logging service type identifier associated with the log message;

wherein the at least one stored element of the log message is one from the group comprising the message header and the message payload; and wherein one of the plurality of data logging service types is an entire-message logging type.

* * * * *